United States Patent [19]

Eddy

[11] Patent Number: 4,568,203

[45] Date of Patent: Feb. 4, 1986

[54] THRUST BEARING

[75] Inventor: Richard P. Eddy, Gardena, Calif.

[73] Assignee: Excellon Industries, Torrance, Calif.

[21] Appl. No.: 561,901

[22] Filed: Dec. 15, 1983

[51] Int. Cl.$^4$ ............................................. F16C 32/06
[52] U.S. Cl. ........................................ 384/99; 384/121
[58] Field of Search ................. 384/99, 121, 113, 107, 384/111, 124

[56] References Cited

U.S. PATENT DOCUMENTS

| | | |
|---|---|---|
| 611,984 | 10/1898 | Wright . |
| 1,387,930 | 8/1921 | Kingsbury et al. . |
| 1,666,521 | 4/1928 | Allen . |
| 1,906,715 | 5/1933 | Penick . |
| 2,102,534 | 12/1937 | Howarth . |
| 2,617,696 | 11/1952 | Honiss . |
| 2,877,066 | 3/1959 | Baumeister . |
| 3,081,682 | 3/1963 | Khoury . |
| 3,186,774 | 6/1965 | Wilcox ..................................... 308/5 |
| 3,205,697 | 9/1965 | Parsons et al. .............................. 73/1 |
| 3,246,936 | 4/1966 | Carle . |
| 3,249,390 | 5/1966 | Schwartzman . |
| 3,326,453 | 6/1967 | Kun ..................................... 230/116 |
| 3,368,850 | 2/1968 | Wilcox ..................................... 308/5 |
| 3,389,625 | 6/1968 | Wagner ......................................... 82/ |
| 3,391,965 | 7/1968 | Lindeboom . |
| 3,432,213 | 3/1969 | Adams ..................................... 308/5 |
| 3,508,430 | 4/1970 | Edmondson ........................ 72/456 |
| 3,578,827 | 5/1971 | Smith ..................................... 308/5 |
| 3,612,628 | 10/1971 | Steele . |
| 3,649,089 | 3/1972 | Bouvier . |
| 3,827,770 | 8/1974 | Horler . |
| 4,090,742 | 5/1978 | Ueda . |
| 4,366,994 | 1/1983 | Yoshioka ............................... 384/99 |
| 4,378,134 | 3/1983 | Eddy ..................................... 308/5 R |
| 4,430,011 | 2/1984 | Kun ........................................ 384/99 |
| 4,453,837 | 6/1984 | Shimizu et al. ..................... 384/121 |

FOREIGN PATENT DOCUMENTS 1054899 1/1967 United Kingdom .
1076227 7/1967 United Kingdom .

Primary Examiner—Lenard A. Footland
Attorney, Agent, or Firm—Gausewitz, Carr & Rothenberg

[57] ABSTRACT

The precision rotatable polygonal mirror of a laser scanning system is fixed to one of a pair of spaced flanges of a rotatable shaft, and has one surface supported upon a fixed air bearing. A floating air bearing is formed to define a differential piston which is pressurized to load the bearing and provide the desired air film bearing thicknesses. The two part thrust bearing has a net effective axial dimension that varies to significantly decrease required tolerances, to minimize moments introduced into the shaft and polygonal mirror, and to provide a more constant air bearing clearance over a larger range of air pressures.

23 Claims, 4 Drawing Figures

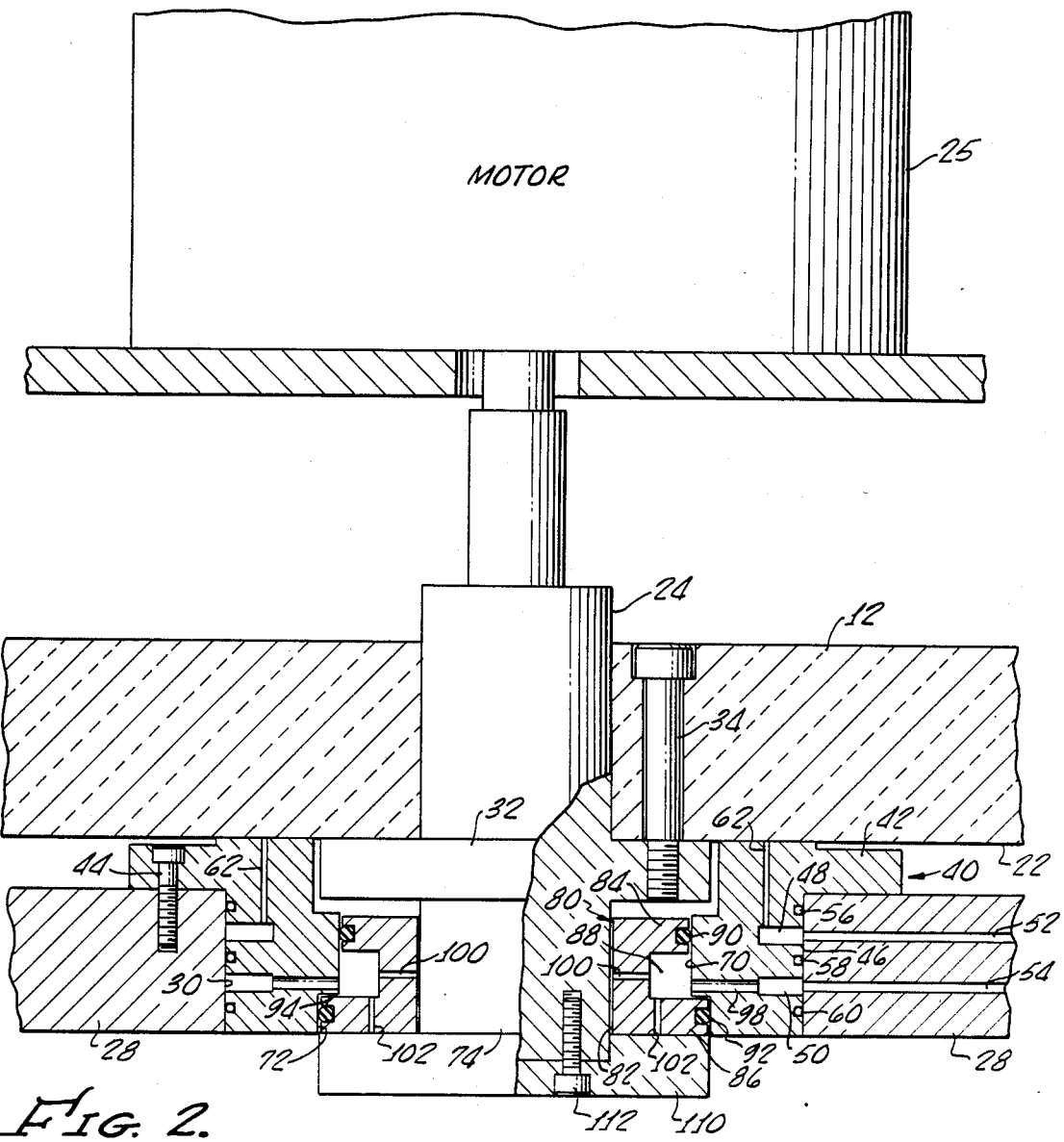
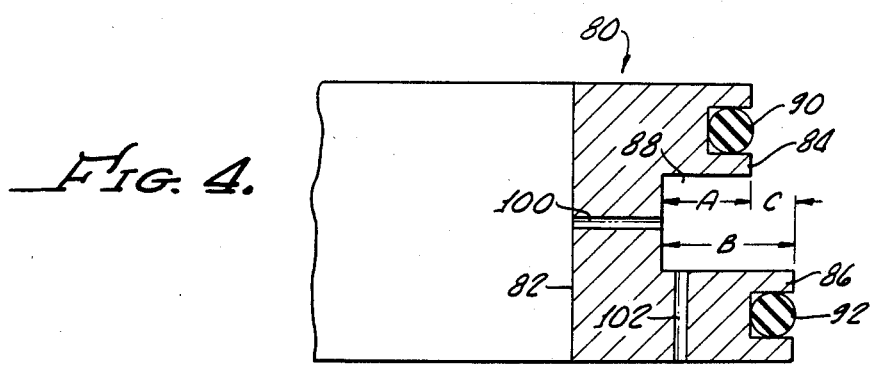

THRUST BEARING

BACKGROUND OF THE INVENTION

The present invention relates to gas bearings and more particularly concerns a bearing assembly having a floating bearing that significantly reduces required dimensional tolerances.

Various types of optical scanning devices, such as a lasar pattern generator, employ a rotating mirror from which a laser beam is reflected in successive angular sweeps across the surface of a medium upon which a pattern is to be generated or which bears a pattern that is to be read by the scanning assembly. Such systems demand extreme precision and stability of the rotating mirror because of the high tolerance requirements for positioning of the laser beam. To attain exceedingly high precision and stability for the rotating mirror position, some prior systems have employed air thrust bearings positioned between and bearing against mutually opposed bearing surfaces on the rotating part. In such systems, a thrust bearing that is fixed to a mounting plate, locates the mirror rotational shaft axis by means of a radial bearing and axially locates the shaft and mirror by a fixed length thrust bearing. The thrust bearing is positioned between mutually spaced and mutually parallel bearing surfaces on the shaft that extend in planes perpendicular to the rotation axis. Any small degree of lack of parallelism of such opposed bearing surfaces introduces significant moments on the shaft and mirror, which moments, even in very small amounts, can cause the reflected laser beam to deflect beyond acceptable limits. Such moments also introduce vibrations which are difficult to damp. The exceeding sensitivity of the system to small amounts of error in thrust surface parallelism requires tolerances in the order of a few ten thousandths of an inch, thus increasing the difficulty and greatly raising the cost of manufacturing the assembly.

Another problem with existing bearings is that air pressures must be closely adjusted and maintained to float the bearing at the designated height. The system is sensitive to loss or significant decrease in supplied air pressure. Should the air pressure supply to such a rotating mirror bearing assembly fail, or should the supplied air pressure decrease below a certain amount, the air bearing, which reacts to the load of the mirror weight (where the mirror is mounted for rotation about a vertical axis), may decrease in air film thickness to a point where the mirror is no longer supported by the air film. Resulting metal to metal contact may effectively destroy the highly precise and expensive mirror. For example, in a system arranged to operate under an eighty pounds per square inch air supply, catastrophic metal to metal contact will occur if the pressure should drop to thirty-five to forty pounds per square inch. Thus it is frequently necessary to employ a reserve air tank that will automatically supply air at the proper pressure upon a sensed decrease in pressure of the normal air supply.

It is an object of the present invention to avoid or minimize above-mentioned problems.

SUMMARY OF THE INVENTION

In carrying out principles of the present invention, in accordance with a preferred embodiment thereof, a precision bearing assembly includes first and second relatively movable members, of which one has oppositely disposed thrust bearing surfaces. A fixed gas bearing is secured to the second member to provide a gas thrust film at the first surface. A floating gas bearing is positioned adjacent the second surface and is formed by a piston part and a cylinder part having a gas plenum therebetween. In one embodiment the piston part has an opening that is sealed by the first member, or by the bearing means secured to the first member, which forms the cylinder part. The plenum is pressurized to urge the floating bearing toward the second surface to provide a second gas thrust film at the second surface. According to a feature of the invention, the plenum opens laterally and defines a differential piston that is urged toward the second surface. The same gas in the plenum both loads the bearing and provides gas to the gas bearing film so that a more constant height of the supporting gas thrust film is maintained over a greater range of variation of pressure of supplied gas. The arrangement provides a more uniform loading because the differential piston floats and is gas loaded. It also allows the bearing to be designed with looser tolerances than a comparable solid or fixed length bearing. The floating thrust bearing is forced to operate at correct clearances by appropriate adjustment of the applied gas pressure and allows the axle assembly to be loaded without introduction of unwanted moments into the axle and mirror. Thus the rotating mirror attains increased stability during rotation and experiences minimized deflection and vibration.

BRIEF DESCRIPTION OF THE DRAWINGS

FIG. 2 is an elevation section through a bearing assembly embodying principles of the present invention.

FIG. 4 illustrates geometry of the differential piston.

DETAILED DESCRIPTION

The present invention is applicable to systems wherein parts have relative freedom in either rotation or translation. It has been initally mechanized in a rotating system and will be described in such mechanization for purposes of exposition.

Figure 1:
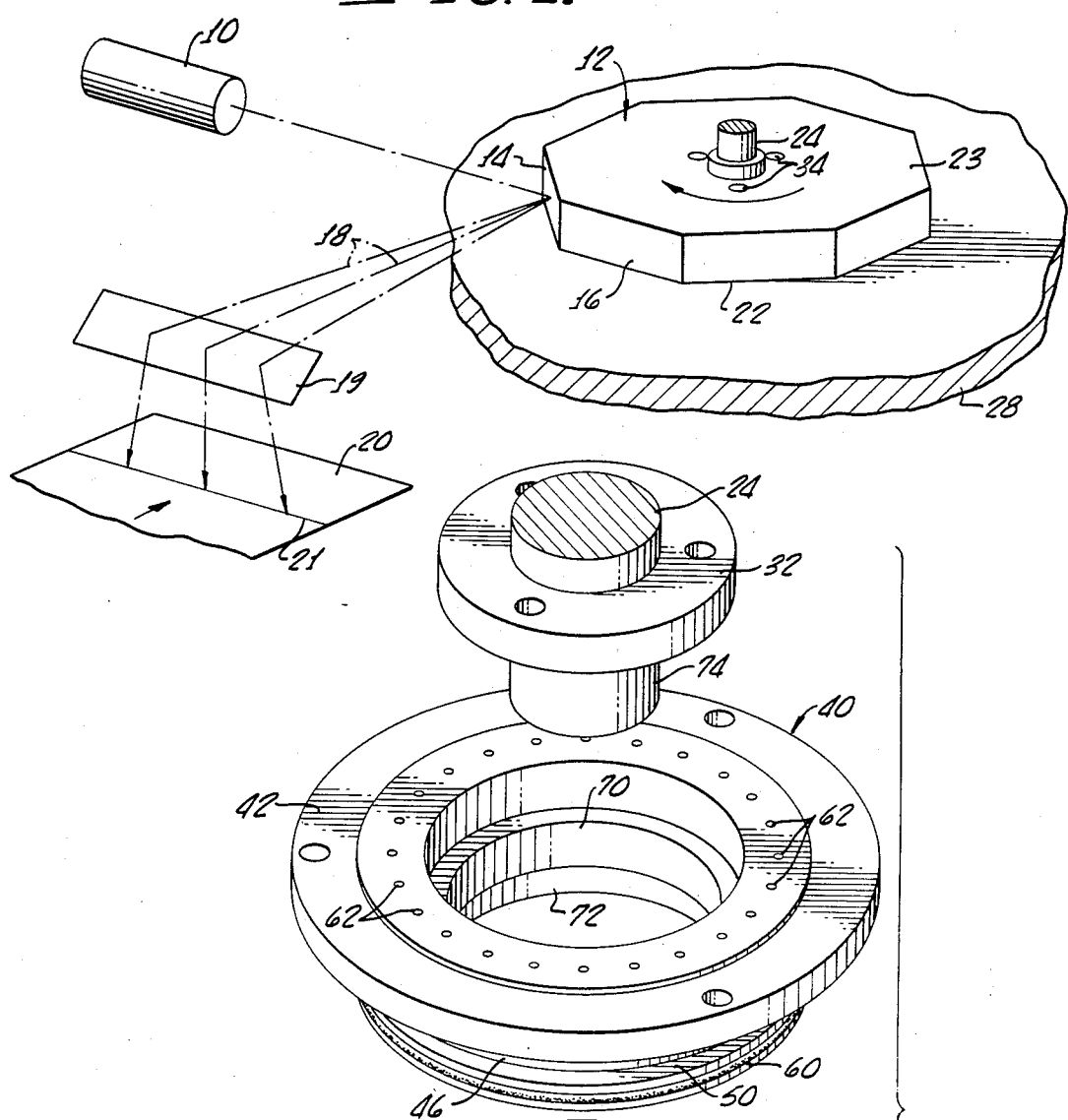
FIG. 1 is a pictorial illustration showing, in simplified form, a laser beam reflected from a rotating polygonal mirror.

Relevant portions of a exemplary laser scanning system having a bearing system of the present invention are illustrated in FIG. 1. Light from a laser 10 is directed to a multi-faceted polygonal mirror 12 to be reflected from successive vertical facets 14, 16, etc., in a pattern of horizontal rays 18 that are reflected downwardly from a fixed plane mirror 19 to sweep a line 21 across a medium 20 that is carried across the sweep line in a direction normal to the plane of the sweep to enable successive lines to be swept along the medium 20. The mirror comprises a reflective polygonal body, having a primary precision lower surface 22 opposite its upper surface 23. Each of the facets 14, 16, etc., is ground with reference to the precision surface 22. All of the reflective facets are precisely planar and precisely perpendicular to the primary precision surface 22. The mirror assembly is mounted for rotation upon a vertical shaft or axle 24 that is driven by a motor 25 (FIG. 2). The assembly of the mirror, axle and bearing assembly are all carried upon a mounting plate 28 having an aperture 30 through which the axle and bearing assembly extend.

Figure 3:
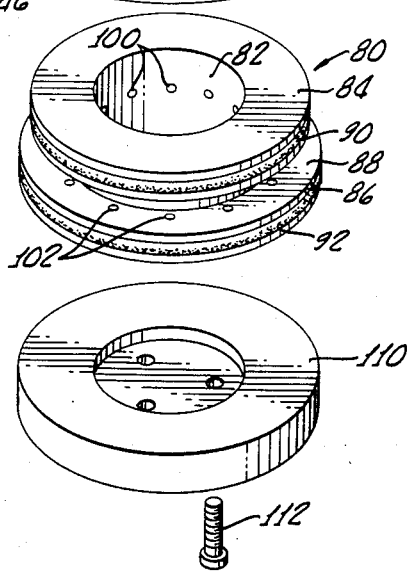
FIG. 3 is an exploded perspective illustration showing the fixed and floating annular bearings.

Axle 24 includes a fixed annular radially extending flange 32 (FIGS. 2, 3) to which the mirror 12 is fixedly secured by means of a plurality of bolts 34, with the precision mirror surface 22 being mounted directly to the upwardly facing surface of flange 32.

A fixed annular gas thrust bearing or pad 40 has an outwardly projecting circumferentially projecting shoulder 42 that is bolted to an upper surface of the supporting or mounting plate 28 by means of a plurality of bolts such as the bolt shown at 44. The fixed bearing 40 includes an outer cylindrical surface 46 that bears against the bore of aperture 30 of the mounting plate and is formed with a pair of axially spaced circumferential gas manifold channels 48, 50, that completely circumscribe the bearing. Each channel opens radially outwardly for communication with a respective one of a pair of gas supply conduits 52, 54 formed in the mounting plate 28. O-ring seals 56, 58, 60 are carried by the fixed bearing 40 on opposite sides of the manifold channels 48, 50 to seal these to the gas conduits 52, 54. A plurality of circumferentially spaced passages 62 extends vertically through the body of the air bearing 40, from the upper manifold channel 48, to the mirror surface 22 which is immediately adjacent the upper surface of the pad or bearing 40.

Fixed bearing 40 has an axial bore formed with a first section 70 of relatively small diameter and a second section 72 of relatively larger diameter. The fixed gas bearing bore 72 is radially spaced from and concentric with a section 74 of the axle 24 that is below the first flange 32. Mounted within the annular space between the axle section 74 and the fixed bearing bore sections 70, 72, is an annular floating bearing or pad 80 having an inner bore 82 circumscribing and adjacent the outer surface of axle section 74 and having first and second radially outwardly, mutally axially spaced annular legs 84, 86, which define between them a plenum 88. The outer end of floating bearing leg 84 bears against the small diameter bore surface 70 of the fixed bearing and is sealed against the bore 70 by means of an O-ring 90 carried by the floating bearing. The outer end of larger radius leg 86 bears against the larger diameter bore section 72 of the fixed bearing, and is sealed against the bore section by a second O-ring 92 carried by the floating bearing.

The stepped diameter of the bore of fixed bearing 40, provides a downwardly facing shoulder 94 which overlies but is slightly spaced from the upwardly facing surface of the outermost portion of the longer floating bearing leg 86.

Fixed bearing 40 is formed with a conduit 98 extending from the second gas channel 50 to the interior of plenum 88, and groups of circumferentially spaced conduits 100, 102 provide gas flow from the interior of the plenum 88 to the radial bearing surface of bore 82 and to the lower surface of the floating bearing 80. The assembly is held together by a means of an axle cap 110 bolted to the lower end of the axle section 74 by means of a plurality of bolts such as bolt 112. A gas, such as air under pressure, is supplied from a pressure source (not shown) to the conduits 52, 54 to flow gas to the manifold channels 48, 50 and thence, by means of conduits 62, to the first thrust bearing formed between the lower precision ground surface of the mirror and the upper surface of the fixed air bearing. Gas from the lower manifold chamber 50 flows into the plenum 88 and through the conduits 100 to provide a radial gas film at the radial bearing surface 82. The floating bearing 80 provides a lower thrust bearing between the lower face of the floating annular bearing and the upper surface of the axle cap 110 by means of gas supplied from plenum 88 via the conduits 102. The same gas in plenum 88 is supplied through conduits 102 to the floating bearing gas film so that the gas pressure at the bearing surface varies in direct relation to the gas pressure within the plenum.

The floating bearing 80 is driven downwardly toward the axle cap by a piston and cylinder arrangement formed by the floating and fixed bearings. One bearing forms a piston and the other forms a cylinder. The floating bearing forms a differential piston of which the geometry is illustrated in FIG. 4. The radial extent of the shorter leg 84 (as measured from the main body of the bearing) is indicated by the distance A and the radial extent of the longer leg 86 is indicated by the distance B. Accordingly, the differential piston has a net or effective piston area in planes perpendicular to the rotation axis comprising an annular area having a radial extent indicated at C, where C is equal to B-A. The differential piston is driven axially of the shaft (downwardly) by pressure of gas in the plenum 88 which has a longitudinally slidable sealing relation with the bore sections 70 and 72 of the fixed thrust bearing. The use of a differential piston allows the floating gas bearing to be made reasonably strong and of a fairly large size without producing excessively large forces. Because the configuration of the differential piston provides a net internal area in a plane that faces the mirror surface 22, pressure within the laterally opening plenum 88 forces the differential piston downwardly with a total force proportional to the net area of the differential piston. This downward force is reacted against the mounting plate through the fixed bearing 40 at its downwardly facing shoulder 94. The arrangement enables proportioning the parts to provide a desired amount of piston force to increase the bearing thrust loading. For example, with a gas supply pressure of 80 pounds per square inch and a floating annular bearing of approximately two inches in diameter, the parts are readily proportioned to provide a net area of the differential piston of between 0.5 and 0.6 square inches, whereby a net downward bearing loading force of about 45 pounds is exerted by the differential piston. Thus, the floating bearing is formed, in effect, by a piston part (the differential piston) and a cylinder part. The cylinder part is, in effect, formed by and fixed to the mounting plate and fixed bearing.

The gas bearing assembly comprises two bearing parts of which thrust bearing part 40 is fixed and the other bearing part 80 is a floating piston capable of relatively large vertical displacement. This arrangement provides a bearing that, in effect, is automatically adjustable in length along the axle as the distance between the two opposed bearing surfaces of the mirror and end cap varies. A compact longitudinal arrangement is provided by effectively mounting the floating thrust bearing within the bore of the fixed thrust bearing, making the two thrust bearing parts mutually concentric and relatively axially extensible. The arrangement permits much looser tolerances and less precision of parallelism between the opposed facing surfaces of the mirror and axle end cap, because the floating bearing is formed by the piston that can shift axially by relatively large amounts as the distance between the opposed bearing surfaces changes. The bearing can accommodate very large changes in dimensions caused by tolerance build-up or temperature changes without effect operating height (gas bearing film thickness). As the floating bearing shifts axially, the constant pressure in the plenum 88 provides a constant load on the bearing and maintains the desired clearances at the bearing surfaces to ensure the proper thickness of the gas bearing films.

The weight of the mirror itself provides a first thrust load on the bearing. This thurst load is augmented by the additional load provided by action of the differential piston. Thus in an exemplary arrangement, wherein the mirror weight provides a thrust load of about eight pounds, the load exerted by the mirror is considerably less than the added load (about forty-five pounds) exerted by the differential piston. A stiffer, more stable bearing is achieved by the added load. The described arrangement allows a very large load (as much as five times the mirror weight) to be applied to the thrust bearing, thereby decreasing the gas thrust film thickness and providing a stiffer bearing in a small space.

An unexpected and surprising advantage results from operation of the described bearing. This advantage is that the system exhibits significantly increased tolerance to changes in applied gas pressure. In a previously employed one piece thrust bearing supplied with air pressure of 80 pounds per square inch, a drop in the pressure to about 35 to 40 pounds per square inch, will decrease the gas film supporting characteristics to a point where the bearing is no longer able to support the weight of the mirror. Should this occur, metal to metal contact will ensue, destroying the mirror. With the floating bearing arrangement described herein, however, the bearing is loaded with the very same gas which provides gas to the bearing film through the orifices. Thus both load and bearing height vary with variation of pressure of supplied gas. As the supplied pressure decreases, bearing film height ordinarily tends to decrease. However, the load on the bearing also decreases because of the fixed piston area and because the added load component caused by the differential piston 80 is directly related to the magnitude of the pressure. Such decrease in load tends to counteract the tendency to decrease bearing film height. Similarly, as supplied gas pressure increases, the load on the bearing increases and the load carrying capacity of the bearing also increases because of increased pressure to the bearing surface through conduits 102. This means that when the piston is designed for air bearing size, conduit diameter and lift coefficient it can tolerate a large variation of air pressure without affecting the operating height. It has been found that, with the described arrangement, supplied gas pressure can drop from a normal 80 pounds per square inch to as low as nearly 20 pounds per square inch before occurence of metal to metal contact.

Many variations of configuration and application of the described bearing assembly can be made without departing from principles of the invention. The arrangement described above has the two bearing parts, fixed part and floating part positioned on the same side of the rotatable mirror. Nevertheless the invention can also be mechanized with the two bearing parts on opposite sides of the mirror between two mutually spaced arms of a fixed support structure. In another modification the floating bearing piston can be made to react directly against this fixed support instead of against the fixed bearing.

The floating bearing arrangement decreases required tolerances, as previously described, and also avoids moments exerted upon the axle and mirror due to uneven bearing loading. The floating bearing provides equalized thrust loading that is distributed along the bearing surfaces with much greater uniformity. Even with significantly looser tolerances, the floating bearing is constrained to operate at the appropriate clearances and desired gas thrust film thicknesses because of the applied gas pressure on the differential piston. Because axial thrust load is a function of gas pressure in the plenum, and bearing height is also a function of pressure of the same gas that provides the thrust load, the bearing clearance will vary less over a wider range of varying gas pressures. The net result is that, in use with a rotating system of greatly eased tolerances, the mirror may rotate at high speed with maximum stability and minimum deflection, vibration and wobble.

The foregoing detailed description is to be clearly understood as given by way of illustration and example only, the spirit and scope of this invention being limited solely by the appended claims.

What is claimed is:

1. Apparatus for precision movement comprising
   a first member having first and second mutually spaced and facing thrust bearing surfaces,
   a second member,
   said members being movable relative to each other,
   first gas thrust bearing means on said second member positioned to bear against said first surface,
   means for flowing gas through said bearing means to form a first gas thrust film,
   second gas thrust bearing means positioned to bear against said second surface, said second bearing means comprising
   a piston mounted between said first member and said first bearing means for motion toward and away from said first surface, and
   a bearing pad on said piston adjacent said second surface,
   means for urging said piston toward said second surface, and
   means for flowing gas through said bearing pad to form a second thrust film.

2. The apparatus of claim 1 wherein said means for urging said piston toward said surface comprises a laterally opening plenum in said piston, and means for flowing pressurized gas to said plenum, whereby said piston comprises a differential piston urged toward said second surface by pressure in said plenum.

3. The apparatus of claim 1 wherein said means for urging said piston towards said second surface comprises a gas plenum in said piston, means for flowing pressurized gas to said plenum, means for flowing gas from said plenum through said bearing pad to said second surface, said plenum having a net internal area in planes perpendicular to the axis of the shaft that faces toward said first surface, whereby pressurized gas within the plenum will urge the pad towards said second surface.

4. The apparatus of claim 3 wherein said first member comprises a shaft, wherein each said bearing means has an annular configuration, circumscribing said shaft and wherein one of said bearing means is mounted within the other.

5. The apparatus of claim 4 wherein said shaft has first and second axially spaced annular flanges defining said first and second bearing surfaces, said second member comprising a support plate having an aperture receiving said shaft, said piston comprising a cylindrical body positioned between said flanges and having first and second radially outwardly and mutually axially spaced leg sections defining said plenum therebetween, said first leg section having a greater radial extent than said second leg section.

6. The apparatus of claim 5 wherein said first bearing means comprises an annular bearing body having an outer side positioned against the wall of the aperture of said support plate and a bore extending between said leg sections and abutting radially outwardly extending ends of said leg sections in sealing relation thereto, said means for providing pressurized gas to said plenum comprising conduit means extending through said support plate and through said first bearing means, said first bearing means having a transverse surface, said first member including a rotatable device fixed to said shaft adjacent said first annular flange thereof, and means for flowing gas from said support plate through said first bearing means to said transverse surface, said transverse surface of the first bearing means being positioned adjacent said rotatable device.

7. Apparatus for precision movement comprising
a first member having first and second mutually spaced bearing surfaces,
a second member,
said members being movable relative to each other,
said second member including first gas bearing means secured thereto and having a first gas bearing pad positioned adjacent said first surface,
means for flowing gas through said bearing pad to form a gas thrust film between said pad and said first surface,
second gas bearing means comprising a floating bearing pad positioned adjacent said second surface, said floating pad including a gas plenum having an opening,
means for providing pressurized gas to said plenum,
said first member including means engaged with said second bearing means for sealing said opening, whereby pressure in said plenum is reacted against said first member to urge said floating pad toward said second surface, and
means for flowing gas from said plenum through said floating pad to said second surface to form a gas thrust film between said floating pad and said second surface.

8. The apparatus of claim 7 wherein said plenum opens laterally and said floating pad defines a differential piston that is urged toward said second surface by pressurized gas in said plenum.

9. The apparatus of claim 8 wherein said floating pad includes first and second spaced leg sections interconnected by a central section, said sections collectively defining said plenum, said first leg section being longer than said second leg section, said first bearing means comprising said means for closing said opening and including a portion extending between said leg sections and overlying an end of said first leg section to close said plenum.

10. The apparatus of claim 7 wherein said first member includes an intermediate portion extending between said first and second surfaces, said floating pad having a transverse bearing surface positioned adjacent said intermediate portion, and means for flowing gas from said plenum to said transverse bearing surface.

11. The apparatus of claim 7 wherein said first member comprises a shaft, wherein said second member comprises a fixed support for rotatably supporting said shaft by means of said bearing means, said support having an aperture receiving said shaft, said first bearing means having an annular configuration defining a bore and being fixed to said support between said shaft and said support, said floating pad having an annular configuration and being movably mounted within said bore, said means for providing gas to said plenum comprising a gas conduit extending through said first bearing means.

12. A precision movable assembly comprising,
first and second relatively movable members,
first and second axially spaced thrust elements fixed to said first member and extending therefrom adjacent said second member,
first thrust bearing means fixed to said second member and including a first thrust bearing surface positioned adjacent said first thrust element,
a floating bearing piston positioned between said thrust elements adjacent said first thrust bearing means, said piston being mounted for limited motion toward and away from at least one of said thrust elements, said piston having an open-sided plenum therein,
said first bearing means including a portion extending across the open side of said plenum and sealing said plenum,
means for flowing pressurized gas from said second member through said first bearing means to said first thrust element to thereby provide a thrust gas film between said first thrust element and said first bearing means,
means for flowing pressurized gas from said second member into said plenum whereby said floating bearing piston is urged toward said second thrust element, and
means for flowing gas from said plenum through said piston to said second thrust element to provide a second thrust gas film between said second thrust element and said floating bearing piston.

13. The assembly of claim 12 wherein said second member comprises a support body having an aperture, wherein said first member comprises a rotatable shaft extending through the aperture of said body and wherein said floating piston comprises an annular body having first and second outwardly projecting mutually longitudinally spaced annular legs defining said open-sided plenum therebetween, said second leg having a greater radial extent than said first leg, said first bearing means including a sealing surface extending axially from one of said legs to the other and having a portion lying adjacent an end portion of said second leg, and including sealing means between said first and second legs and said first bearing means, whereby said floating piston forms a differential piston and is urged toward the second thrust element by gas pressure in said plenum.

14. The assembly of claim 13 wherein one of said thrust elements comprises an annular flange fixed to said shaft.

15. The assembly of claim 13 wherein one of said thrust elements comprises an annular flange and a multifaceted mirror fixed thereto.

16. A gas thrust bearing assembly comprising
a shaft having first and second axially spaced annular flanges fixed thereto,
a support body having a shaft receiving aperture,
a rotatable member fixed to said first flange,
a first annular gas thrust bearing fixed to said support body at said support body aperture, said thrust bearing having a gas thrust surface adjacent said rotatable member, and having an inner annular surface defining a bore having a first section of a relatively small diameter adjacent said first flange and having a second section of relatively larger diameter adjacent said second flange, a floating annular gas bearing mounted on said shaft between said first and second flanges and within the bore of said first gas thrust bearing, said floating bearing having first and second axially spaced radially extending annular legs of mutually different diameters defining a radially opening plenum therebetween, an outer end of said first leg being sealed against the first bore section of said first gas thrust bearing and the outer end of said second leg being sealed against the second bore section of said first gas thrust bearing, whereby said floating bearing defines a differential piston, means for flowing pressurized gas through said first gas thrust bearing to form a first gas thrust film, means for flowing gas to said plenum to urge said differential piston toward said second flange, and means for flowing gas from said plenum through said floating gas bearing to form a second gas thrust film.

17. The assembly of claim 16, wherein said rotatable member comprises a polygonal mirror having a primary precision surface and a number of facets ground with reference to said primary precision surface, said mirror surface abutting a face of said first flange remote from said second flange to thereby mount the mirror to said first flange on said precision surface, said first thrust bearing having a bearing surface adjacent said precision mirror surface and providing said first gas film therebetween.

18. A gas thrust bearing assembly having decreased sensitivity to pressure variation of supplied gas comprising a first member having first and second oppositely disposed thrust bearing surfaces, a second member, said members being movable relative to each other, said second member including first gas thrust bearing means positioned to bear against said first surface, second gas thrust bearing means positioned to bear against said second surface and including means for maintaining a substantially constant thickness gas thrust film at said second surface as pressure of supplied gas varies, said second bearing means comprising a cylinder part, and a piston part mounted in said cylinder part, said parts being relatively movable toward and away from each other and defining a plenum therebetween, one of said parts being fixed to said second member, the other of said parts being relatively movable toward and away from said second surface and having a bearing face positioned adjacent said second surface, means for supplying pressurized gas to said plenum to urge said other part toward said second surface, and means for supplying pressurized gas from said plenum to said bearing face to provide a thrust gas film between said bearing face and said second surface, whereby said second bearing means is loaded against said second surface with the same gas that provides said thrust gas film, whereby both the load carrying capacity and the loading of said second bearing means vary in like sense with variation of pressure of supplied gas to maintain a substantially constant thickness of said thrust film as supplied pressure varies.

19. The assembly of claim 18 wherein said piston part comprises a differential piston floating between said first bearing means and said first member, whereby pressurized gas in said plenum urges said differential piston toward said second surface and is reacted against said first bearing means to urge said first bearing means and said first surface toward each other.

20. The assembly of claim 19 wherein said differential piston comprises first and second spaced leg sections extending from a central section and collectively defining said plenum, said first leg section being longer than said second leg section.

21. A variable length, self loading gas thrust bearing assembly comprising a cylinder part, a piston part mounted to said cylinder part for slidable motion in a first direction relative thereto, said parts defining a sealed plenum therebetween and having ends forming oppositely facing bearing faces at the respectively opposite ends of said bearing assembly, means for flowing pressurized gas to said plenum to urge said bearing faces away from one another, and means for flowing gas to said bearing faces to form gas bearing thrust films at said faces.

22. The bearing assembly of claim 21 wherein said cylinder part comprises an annular body having a bore, and wherein said piston part comprises a second annular body having a portion thereof slidably received in said bore.

23. The bearing assembly of claim 21 wherein said last mentioned means comprises means for flowing gas from said plenum to one of said bearing surfaces.

* * * * *